United States Patent
Momose et al.

(10) Patent No.: US 10,817,242 B2
(45) Date of Patent: Oct. 27, 2020

(54) IMAGE DISPLAY DEVICE, CONNECTION METHOD OF IMAGE DISPLAY DEVICE, AND MULTI-DISPLAY SYSTEM

(71) Applicant: NEC Display Solutions, Ltd., Tokyo (JP)

(72) Inventors: Keisuke Momose, Tokyo (JP); Tohru Kataoka, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/464,905

(22) PCT Filed: Dec. 21, 2016

(86) PCT No.: PCT/JP2016/088085
§ 371 (c)(1),
(2) Date: May 29, 2019

(87) PCT Pub. No.: WO2018/116399
PCT Pub. Date: Jun. 28, 2018

(65) Prior Publication Data
US 2019/0286404 A1    Sep. 19, 2019

(51) Int. Cl.
*G09G 5/00* (2006.01)
*G06F 3/14* (2006.01)
*H04N 9/31* (2006.01)

(52) U.S. Cl.
CPC ............. *G06F 3/1446* (2013.01); *G09G 5/00* (2013.01); *G09G 5/006* (2013.01); *H04N 9/3147* (2013.01); *G09G 2370/12* (2013.01)

(58) Field of Classification Search
CPC ......... G05B 11/01; G06F 3/1446; G09G 5/00; G09G 5/006; G09G 2370/12; H04N 9/3147; H04N 9/31; H04N 5/64
(Continued)

(56) References Cited

U.S. PATENT DOCUMENTS 7,358,928 B2 * 4/2008 Mori ..................... G06F 3/1431
345/1.1
7,657,330 B2 * 2/2010 Morrison ............ G01F 23/0069
398/2

(Continued)

FOREIGN PATENT DOCUMENTS

JP    2003-345327 A    12/2003
JP    2004-102027 A    4/2004
(Continued)

OTHER PUBLICATIONS

International Search Report (ISR) (PCT Form PCT/ISA/210), in PCT/JP2016/088085, dated Mar. 21, 2017.

*Primary Examiner* — Trang U Tran
(74) *Attorney, Agent, or Firm* — McGinn I.P. Law Group, PLLC (57) ABSTRACT

An image display device that is daisy-chain connected includes: a storage unit that holds identification data that include information of its own device; and a control unit that, when a next-stage side apparatus is connected that is an image display device that can receive a video signal relayed by its own device, receives the identification data of the next-stage side apparatus from that next-stage side apparatus, and when the identification data that were received indicate that the next-stage side apparatus is the same apparatus type as its own device, retains the identification data of its own device without alteration.

13 Claims, 7 Drawing Sheets

(58) Field of Classification Search
USPC ..... 345/1.1, 3.1, 204; 700/19; 348/383, 705, 348/840
See application file for complete search history.

(56) References Cited

U.S. PATENT DOCUMENTS

| | | | | |
|---|---|---|---|---|
| 7,830,906 | B2 * | 11/2010 | Satoh | G06F 13/372 370/423 |
| 10,509,614 | B2 * | 12/2019 | Urata | G09G 5/12 |
| 2005/0243017 | A1 * | 11/2005 | Maruyama | G06F 3/1446 345/1.1 |

FOREIGN PATENT DOCUMENTS

| | | |
|---|---|---|
| JP | WO2006/057324 A1 | 6/2006 |
| JP | 2009-055149 A | 3/2009 |
| JP | 2011-524992 A | 9/2011 |
| JP | 2016-001845 A | 1/2016 |
| JP | 2017-156414 A | 9/2017 |
| WO | WO 2014/112120 A1 | 7/2014 |

\* cited by examiner

FIG.7

IMAGE DISPLAY DEVICE, CONNECTION METHOD OF IMAGE DISPLAY DEVICE, AND MULTI-DISPLAY SYSTEM

TECHNICAL FIELD

The present invention relates to an image display device, a connection method of an image display device, and a multi-display system that uses a plurality of image display devices to display images.

BACKGROUND ART

A multi-display system that uses a plurality of image display devices such as projectors or display devices to display an image enables display of an image on a larger screen, and moreover, at a higher resolution than a single image display device, and such multi-display systems are therefore widely used in event venues and showrooms.

Figure 1:
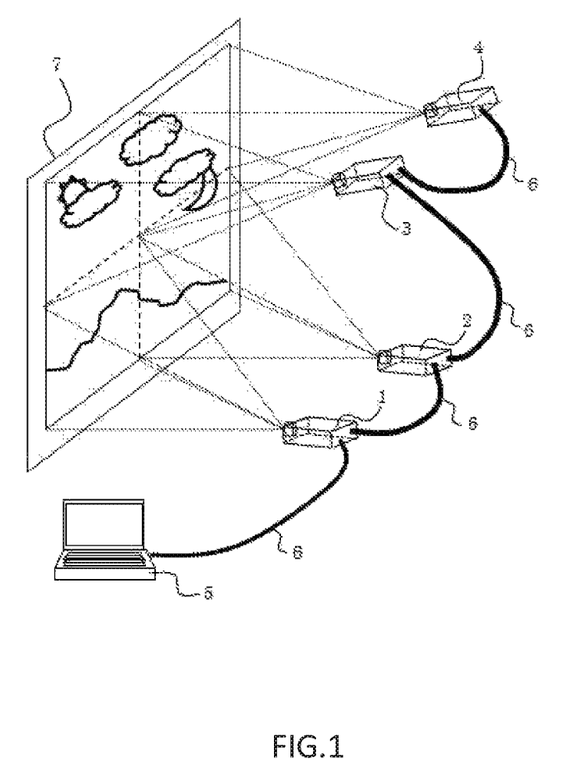
FIG. 1 is a schematic view showing an example of a multi-display system that uses projectors as image display devices.

FIG. 1 is a schematic view showing an example of a multi-display system that uses projectors as the image display devices.

The multi-display system shown in FIG. 1 is provided with a plurality (four in FIG. 1) of projectors 1-4 that are the image display devices, personal computer (hereinbelow abbreviated as "PC") 5 that supplies a video signal to each of projectors 1-4, and screen 7 on which the pictures from projectors 1-4 are projected; and is of a configuration in which HDMI cable 6 that conforms to HDMI (registered trademark: High-Definition Multimedia Interface) standards is used to realize daisy-chain connection between projectors 1-4 and PC 5.

In HDMI, an apparatus that is the video signal source that supplies an HDMI signal that contains a video signal, audio signal, and control signal is referred to as a "Source Apparatus," an apparatus that receives the HDMI signal is referred to as a "Sink apparatus," and an apparatus that relays an HDMI signal is referred to as a "Repeater apparatus". In the multi-display system shown in FIG. 1, PC 5 is the source apparatus, projectors 1-4 are the sink apparatuses. Projectors 1-3 function not only as sink apparatuses but also as repeater apparatuses.

Figure 2:
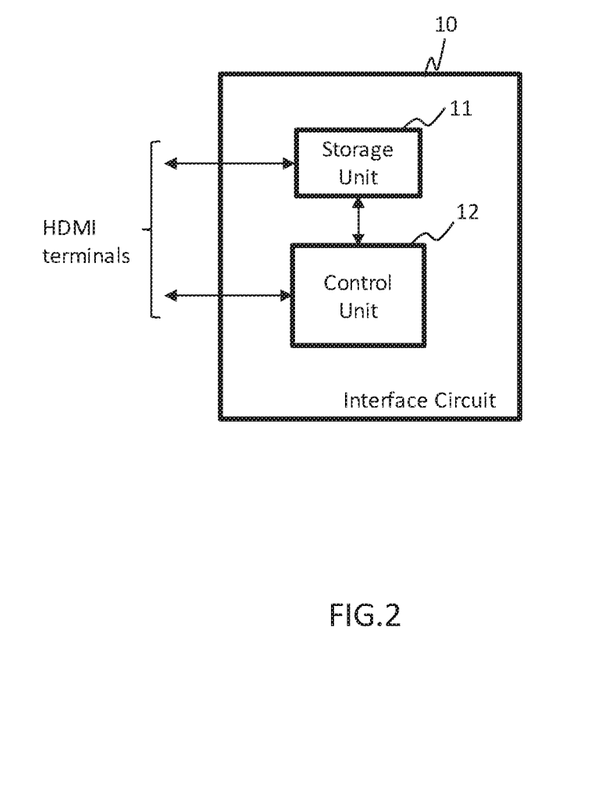
FIG. 2 is a block diagram showing an example of the configuration of an interface circuit that performs processing that is compatible with HDMI that is provided in a source apparatus and each image display device.

A sink apparatus holds EDID (Extended Display Identification Data) that are identification data that include information of its own apparatus such as information indicating its own apparatus type (the maker, model, etc.) and information relating to the specifications (compatible signal formats, resolution, etc.), and when connected to a source apparatus, transmits this EDID to the source apparatus. On the basis of the EDID that is transmitted from the sink apparatus, the source apparatus supplies an HDMI signal that includes a video signal and audio signal that correspond to the specifications of the sink apparatus The source apparatus, repeater apparatus, and sink apparatus are provided with interface circuits that execute processing that is compatible with HDMI, and HDMI terminals (not shown in the figures) that comply with HDMI standards are connected to the interface circuits. FIG. 2 is a block diagram showing an example of the configuration of an interface circuit that executes the processing that complies with HDMI that is provided in the source apparatus and each image display device.

Interface circuit 10 that is shown in FIG. 2 is of a configuration that has storage unit 11 that holds the above-described EDID and control unit 12 that executes the processing procedures of the image display devices (to be described). Interface circuit 10 shown in FIG. 2 is realized by, for example, an Integrated Circuit (IC) for information processing that is provided with a CPU (Central Processing Unit), a storage device, various logical circuits, and communication means for transmitting and receiving signals and information with the source apparatus and other image display devices.

Repeater apparatuses are each provided with two HDMI terminals, one HDMI terminal being connected to one neighboring apparatus (repeater apparatus, source apparatus, or sink apparatus) by way of HDMI cable 6 and the other HDMI terminal being connected to another neighboring apparatus by way of HDMI cable 6. Here, the source apparatus or an image display device that is closer to the source apparatus that is connected by way of HDMI terminals and HDMI cables 6 is referred to as a "preceding-stage side apparatus," and an image display device that is farther from the source apparatus is referred to as a "next-stage side apparatus". In other words, the source apparatus or an image display device that supplies a video signal that is supplied from the source apparatus to the device in question is referred to as a "preceding-stage side apparatus," and an image display device that can receive a video signal that is relayed by the device in question is referred to as a "next-stage side apparatus". A sink apparatus that does not operate as a repeater apparatus may be of a configuration provided with only an HDMI terminal for a preceding-stage side apparatus.

As shown in FIG. 1, a multi-display system in which a plurality of image display devices are daisy-chain connected to a video signal source (source apparatus) is also described in, for example, Patent Documents 1-4.

Figure 3:
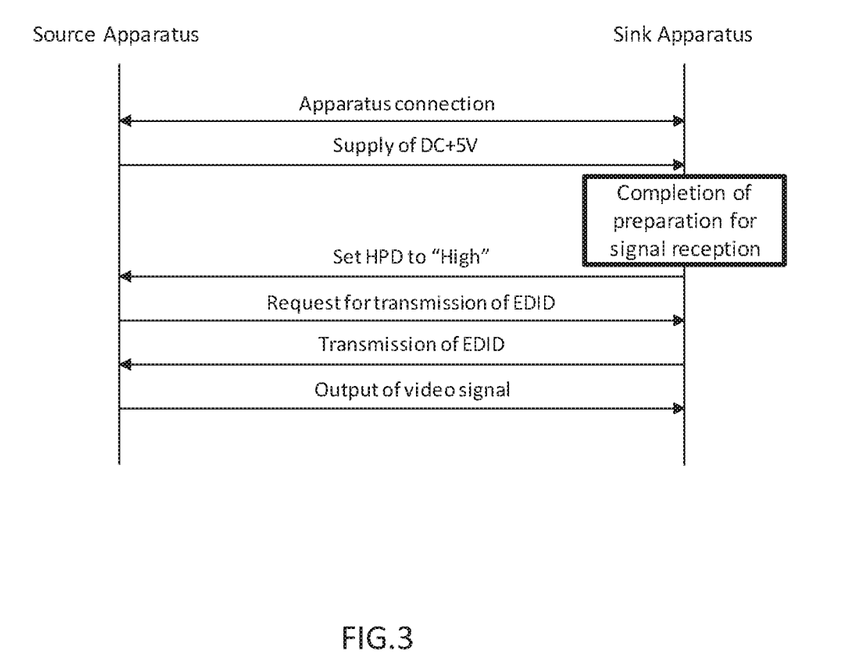
FIG. 3 is a sequence diagram that shows processing procedures in time series at the time of connecting a source apparatus and a sink apparatus.

FIG. 3 is a sequence diagram showing in a time series the processing procedures when a source apparatus is connected to a sink apparatus. FIG. 3 shows the processing procedures until connection is established between the source apparatus and the sink apparatus based on HDMI standards. The "establishment of a connection" between the source apparatus and the sink apparatus refers to the state in which the source apparatus and the sink apparatus are connected using HDMI cable 6, and in which the power sources of the source apparatus and the sink apparatus are each turned ON, and in which an HDMI signal can be supplied from the source apparatus to the sink apparatus. In addition, the processing shown in FIG. 3 is assumed to be performed in interface circuit 10 (control unit 12) shown in FIG. 2.

As shown in FIG. 3, when the source apparatus and the sink apparatus are connected by way of HDMI cable 6 and each of the power sources are turned ON, the source apparatus first supplies a predetermined dc voltage (DC+5V) to the sink apparatus. The DC+5V is supplied from the source apparatus to the sink apparatus through a DC+5V dedicated line that is provided in HDMI cable 6.

When the sink apparatus is supplied with the predetermined dc voltage (DC+5V) from the source apparatus, the preparation for receiving an HDMI signal begins, and when this preparation is completed, a HPD (Hot Plug Detect) signal that is defined by the HDMI standards is switched from "L" (=Low) to "H" (=High), and the completion of the preparation for signal reception is notified to the source apparatus. The preparation for receiving an HDMI signal that is performed by the sink apparatus includes a process of reading the EDID of its own device that is held in nonvolatile memory (for example, SRAM (Static Random Access Memory)). In addition, the above-described DC+5V that is supplied from the source apparatus is used in the switching of the HPD signal from "L" to "H" in the sink apparatus.

When the HPD signal switches from "L" to "H," the source apparatus recognizes that an apparatus that is capable of receiving an HDMI signal (in this case, the sink apparatus) is connected, and uses a DDC/CI (Display Data Channel/Command Interface) function that is defined in the HDMI standards to request the transmission of the EDID of the sink apparatus.

When the transmission of EDID is requested from the source apparatus, the sink apparatus transmits to the source apparatus the EDID of its own apparatus in accordance with this request. The source apparatus subsequently supplies an HDMI signal that includes a video signal and audio signal that accord with the specifications of the sink apparatus that were indicated by the received EDID. The sink apparatus displays the picture that is indicated by the video signal that is contained in the HDMI signal that is supplied from the source apparatus and reproduces the sound that is indicated by the audio signal that is contained in the HDMI signal.

The source apparatus may also be of a configuration that receives the EDID that is held in the storage unit provided in the next-stage sink apparatus by accessing that storage unit.

Figure 4:
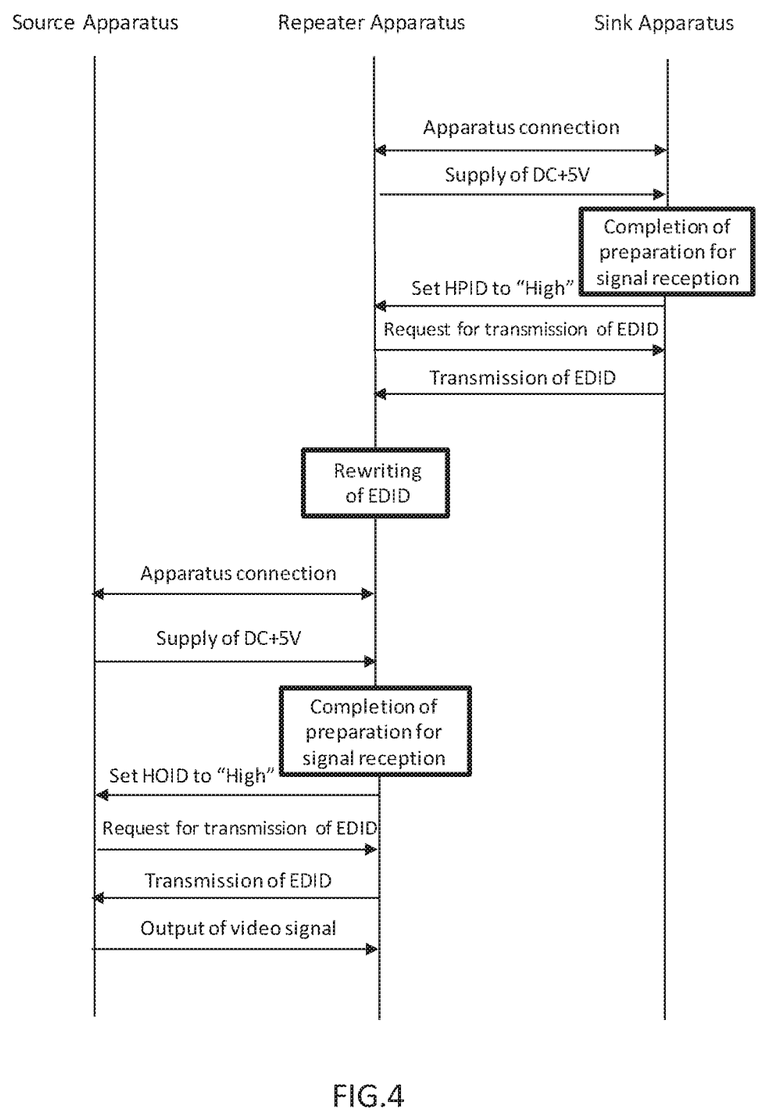
FIG. 4 is a sequence diagram showing processing procedures in time series at the time of connecting a source apparatus, repeater apparatuses, and a sink apparatus.

FIG. 4 is a sequence diagram showing in a time series the processing procedures when the source apparatus is connected to a repeater apparatus and a sink apparatus. FIG. 4 shows the processing procedures until the establishment of a connection between the source apparatus and the repeater apparatus and sink apparatus based on the HDMI standards. However, FIG. 4 shows an example of the processing until the power supplies of the sink apparatus and repeater apparatus are first turned ON, in a state in which the source apparatus, repeater apparatus and sink apparatus are connected using HDMI cable 6, and a connection is established between the sink apparatus and the repeater apparatus, following which the power supply of the source apparatus is turned ON and a connection is established with the repeater apparatus and the source apparatus. In addition, the process shown in FIG. 4 is assumed to be performed by interface circuit 10 (control unit 12) shown in FIG. 2.

As shown in FIG. 4, when the power supplies of the repeater apparatus and the sink apparatus are turned ON, the repeater apparatus supplies a predetermined dc voltage (DC+5V) to the connected sink apparatus similar to the source apparatus shown in FIG. 3. The sink apparatus begins preparation for receiving an HDMI signal when a predetermined dc voltage (DC+5V) is supplied from the repeater apparatus, and when the preparation is completed, switches the HPD signal from "L" to "H" to notify the repeater apparatus of the completion of preparation for signal reception.

When the HPD signal for the next-stage side apparatus switches from "L" to "H," the repeater apparatus recognizes that an apparatus (in this case, a sink apparatus) that can receive an HDMI signal is connected on the next-stage side and uses the DDC/CI function to issue a request to that apparatus for the transmission of EDID. When the repeater apparatus requests the transmission of EDID, the sink apparatus transmits the EDID of its own apparatus to the repeater apparatus in accordance with the request.

The repeater apparatus, upon receiving the EDID from the next-stage side apparatus (the sink apparatus), rewrites and saves the EDID of its own device to the EDID of the next-stage side apparatus (the sink apparatus) such that a video signal that corresponds to the sink apparatus is supplied from the source apparatus.

Next, when the power supply of the source apparatus is turned ON, the source apparatus supplies the predetermined dc voltage (DC+5V) to the repeater apparatus that is connected as in the processing procedure shown in FIG. 3. The repeater apparatus, upon being supplied with the predetermined dc voltage (DC+5V) from the source apparatus, begins preparation for receiving an HDMI signal, and when the preparation is completed, switches the HPD signal for the preceding-stage side apparatus from "L" to "H" and notifies the source apparatus that the preparation for signal reception is completed.

When the HPD signal is switched from "L" to "H," the source apparatus recognizes that an apparatus that can receive an HDMI signal (in this case, a repeater apparatus) is connected and uses the DDC/CI function to request the apparatus that is connected to transmit the EDID. Upon being requested by the source apparatus to transmit EDID, the repeater apparatus transmits to the source apparatus the EDID of the sink apparatus that is being held in accordance with the request. The source apparatus subsequently supplies the repeater apparatus with an HDMI signal that includes a video signal and audio signal that accord with the specifications of the sink apparatus that were indicated by the EDID that was received. The repeater apparatus and sink apparatus display a picture that is indicated by the video signal included in the HDMI signal that was supplied from the source apparatus and reproduce the audio that was indicated by the audio signal included in the HDMI signal.

When a plurality of repeater apparatuses are connected between the source apparatus and the sink apparatus, the EDID of the sink apparatus that is located at the final stage is reported to the source apparatus by each repeater apparatus overwriting each EDID of its own apparatus with the EDID of the next-stage side apparatus. In addition, the order in which the connections are established for the source apparatus, the repeater apparatuses, and the sink apparatus is not limited to the order shown in FIG. 3 and changes according to the order in which the power supply of each apparatus is turned ON.

In addition, there are also repeater apparatuses of a configuration that, by accessing the storage unit that is provided in a next-stage repeater apparatus or the sink apparatus, receives the EDID that is held by a storage unit.

However, in a multi-display system, whether a plurality of image display devices that are daisy-chain connected are repeater apparatuses or sink apparatuses depends on the mutual connection relation, and each image display device therefore uses the above-described HPD signal to determine whether its own device is a repeater apparatus or a sink apparatus.

Figure 5:
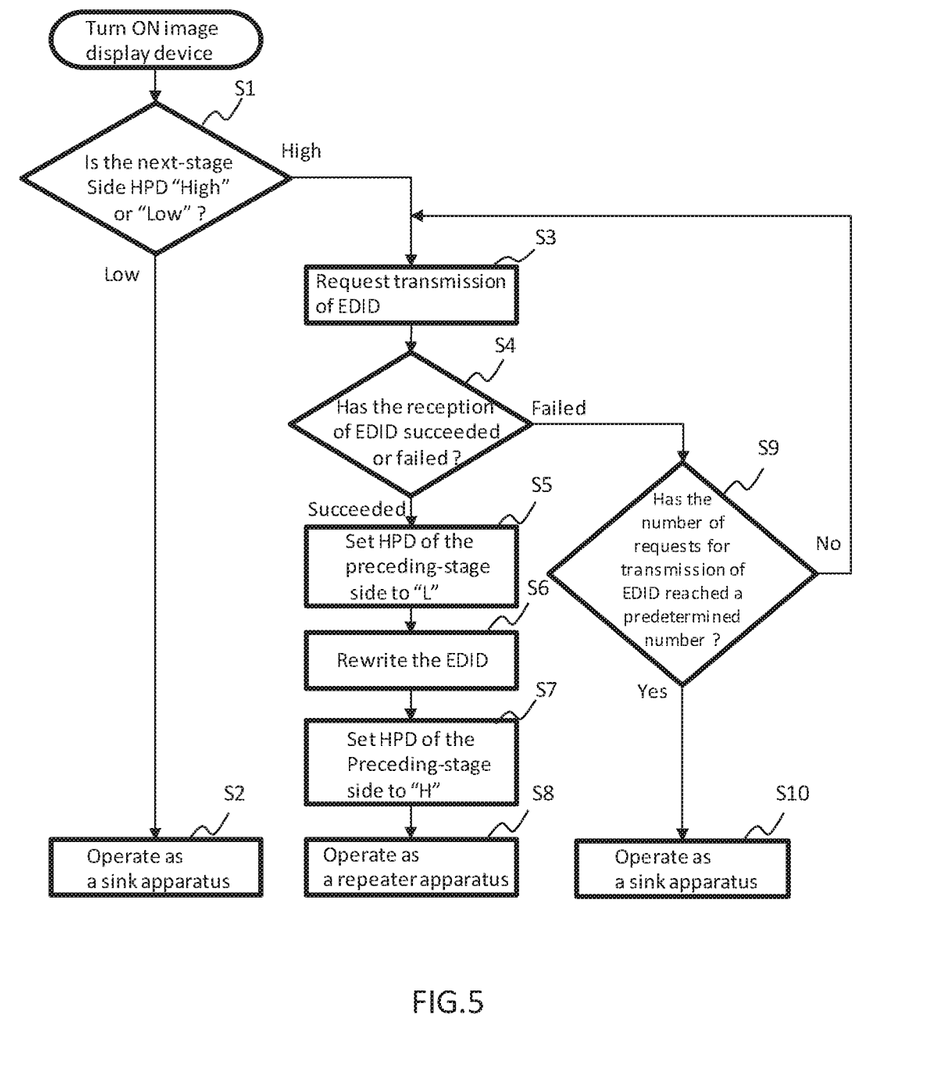
FIG. 5 is a flow chart that shows the processing procedures of a multi-display system of the background art.

FIG. 5 is a flow chart showing the processing procedure of image display devices of the background art. FIG. 5 shows the processing procedure in a state in which a plurality of image display devices is daisy-chain connected to a source apparatus. The processing shown in FIG. 5 is assumed to be executed by interface circuit 10 (control unit 12) shown in FIG. 2.

As shown in FIG. 5, when the power supply is introduced (turned ON), the image display device first checks the HPD signal of the next-stage side apparatus (Step S1), and then operates as a sink apparatus if that HPD signal is "L" (Step S2). If the HPD signal of the next-stage side apparatus is "H," the image display device supplies a signal to the next-stage side apparatus requesting the transmission of EDID (Step S3).

The image display device next determines whether reception of the EDID of the next-stage side apparatus was successful (Step S4), and if the reception of the EDID was successful, sets the HPD signal of the preceding-stage side apparatus to "L" (Step S5) and rewrites the EDID of its own apparatus to the EDID of the next-stage side apparatus that was received (Step S6). In addition, when the rewriting of the EDID is completed and preparations for signal reception are completed, the image display device sets the HPD signal of the preceding-stage side apparatus to "H" (Step S7) and then operates as a repeater apparatus (Step S8).

When the reception of the EDID of the next-stage side apparatus fails in Step S4, the image display device determines whether the number of EDID transmission requests to the next-stage side apparatus has reached a predetermined number (for example, three) (Step S9). If the number of EDID transmission requests has not reached the predetermined number, the image display device returns to Step S3 and repeats the processes up to Step S9. On the other hand, if the EDID transmission request has reached the predetermined number, the image display device operates as a sink apparatus (Step S10).

In a multi-display system in which a plurality of image display devices are connected in a daisy chain as described above, the EDID of the sink apparatus that is connected furthest downstream from the source apparatus is reported to the source apparatus by way of a plurality of repeater apparatuses. Here, in the processing procedures shown in FIG. 4, while an image display device is rewriting the EDID of its own apparatus to the EDID of the next-stage side apparatus, the EDID of its own device becomes temporarily indefinite. Accordingly, the image display device therefore sets the HPD signal of the preceding-stage side apparatus to "L" before rewriting the EDID to report to the preceding-stage side apparatus that preparation for signal reception is incomplete.

In other words, in a multi-display system in which a plurality of image display devices are daisy-chain connected, an HDMI signal cannot be transmitted or received while any of the image display devices is rewriting EDID.

Accordingly, when the number of image display devices that are connected to a source apparatus becomes very large, the time interval required to rewrite EDID at each repeater apparatus lengthens, and as a result, despite the construction and start of operation of a multi-display system, time may be required until images from each image display device are displayed.

In recent years, moreover, an interface that conforms with the HDBaseT (registered trademark) standards has been developed that supports various communication forms that include the above-described HDMI functions, and multi-display systems in which a plurality of image display devices are daisy-chain connected by this HDBaseT have been increasing.

When the video signal cannot be received for at least a fixed time interval after establishment of a connection, an image display device that is connected by HDBaseT issues a request from the HDBaseT interface circuit to the preceding-stage side apparatus for the transmission of the video signal. At this time, the image display device temporarily sets the HPD signal of the preceding-stage side apparatus to "L" and then sets the HPD signal to "H," and as a result, the preceding-stage side apparatus judges that an image display device on the next-stage side has been newly connected.

In this case, the preceding-stage side apparatus again issues an EDID transmission request to the next-stage side image display device that begins from the process of supplying DC+5V, and again rewrites the EDID of its own apparatus to the EDID that was received from the next-stage side image display device.

As described above, a video signal cannot be transmitted or received during the interval in which an image display device is rewriting the EDID of its own device, and as a result, the above-described unnecessary EDID rewriting process causes a further delay of the start of transmission and reception of a video signal. Accordingly, in the worst case, there is the concern that no images will be displayed at all in each image display device despite constructing a multi-display system and starting operation due to the repeated performance of unnecessary EDID rewriting processes in each image display device.

RELATED ART DOCUMENTS

Patent Documents

Patent Document 1: JP 2003-345327 A
Patent Document 2: JP 2004-102027 A
Patent Document 3: WO2006/057324 A1
Patent Document 4: JP 2016-001845 A

SUMMARY

The present invention has the object of providing an image display device, a connection method of an image display device, and a multi-display system that can shorten the time interval until images are displayed from each image display device at the time of starting operation of a multi-display system and that can overcome the inconvenience in which images in each image display device are not displayed.

An exemplary aspect of an image display device according to the present invention for achieving the above-described object is an image display device that is daisy-chain connected and that has:

a storage unit that holds identification data that include information of its own device; and a control unit that, when a next-stage side apparatus is connected that is an image display device that can receive a video signal that its own device repeats, receives identification data of that next-stage side apparatus from the next-stage side apparatus and that retains the identification data of its own apparatus without alteration when the identification data that were received indicate that the next-stage side apparatus is the same apparatus type as its own apparatus.

In addition, an exemplary aspect of an image display device according to the present invention is daisy-chain connected and uses HDMI (High-Definition Multimedia Interface), DVI (Digital Visual Interface), DP (Display Port) or HDBaseT to connect to a preceding-stage side apparatus that supplies a video signal; has:

a storage unit that holds identification data that include information of its own device; and a control unit that, when a next-stage side apparatus is connected that is an image display device that can receive a video signal that its own device repeats, receives identification data of that next-stage side apparatus from the next-stage side apparatus and holds an HPD (Hot Plug Detect) signal that is set to "High" and that is used in the interface if the identification data that were received indicate that the next-stage side apparatus is the same apparatus type as its own device.

An exemplary aspect of the connection method of an image display device according to the present invention is a connection method of an image display device that is daisy-chain connected, and has steps of:

when a second image display device that is an image display device that can receive a video signal that the first image display device repeats is connected to that first image display device, the first image display device receiving identification data of the second image display device from the second image display device; and retaining the identification data of the first image display device without alteration if the identification data that were received indicate that the second image display device is the same apparatus type as the first image display device.

In addition, an exemplary aspect of the connection method of an image display device according to the present invention is a connection method of an image display device that is daisy-chain connected and that uses an interface of any of HDMI (High-Definition Multimedia Interface), DVI (Digital Visual Interface), DP (Display Port) and HDBaseT to connect to a preceding-stage side apparatus that supplies a video signal, the connection method having steps of:

when a next-stage side apparatus is connected that is an image display device that can receive a video signal that its own device repeats, receiving identification data of the next-stage side apparatus from the next-stage side apparatus; and holding an HDP (Hot Plug Detect) signal that is used in the interface and that is set to "High" if the identification data that were received indicate that the next-stage side apparatus is the same apparatus type as its own device.

An exemplary aspect of a multi-display system according to the present invention has a plurality of image display devices that display images indicated by a video signal, the plurality of image display devices being daisy-chain connected, wherein the image display devices each have:

a storage unit that holds identification data that include information of its own device; and a control unit that, when a next-stage side apparatus is connected and that is an image display device that can receive the video signal that its own device repeats, receives identification data of that next-stage side apparatus from the next-stage side apparatus and retains the identification data of its own device without alteration if the identification data that were received indicate that the next-stage side apparatus is the same apparatus type as its own device.

EXEMPLARY EMBODIMENT

The present invention is next described with reference to the accompanying drawings.

In a multi-display system, each image display device preferably displays at the same resolution and brightness, and as a result, image display devices of the same type are used in most cases for the plurality of image display devices. In this case, image display devices of the same type have the same EDID, and each repeater apparatus therefore need not rewrite its EDID.

However, in a multi-display system of the background art described hereinabove, regardless of whether a next-stage side apparatus is an image display device of the same apparatus type as its own device, each image display device determines whether its own device is a repeater apparatus or a sink apparatus and, when it is a repeater apparatus, rewrites the EDID of its own apparatus to the EDID of the next-stage side apparatus in accordance with the processing procedures shown in FIG. 5.

In the present invention, when a repeater apparatus receives the EDID of a next-stage side apparatus, the repeater apparatus checks the manufacturer and product code of the next-stage side apparatus that is included in the EDID, and upon determining that the next-stage side apparatus is an image display device of the same apparatus type as its own device, uses the EDID as is without rewriting the EDID of its own device. By thus using the EDID of its own apparatus without alteration when each repeater apparatus determines that the next-stage side apparatus is an image display device of the same apparatus type as its own device, the process of rewriting the EDID of each repeater apparatus in a multi-display system is reduced.

Further, "same apparatus type" does not necessarily mean that the image display device is of absolutely identical construction, and for example, may include configurations having or lacking options such as input terminals and communication functions. In other words, a device may be taken as being of the same apparatus type when, of information relating to specifications that is included in the EDID, the information for displaying images is the same. In addition, an apparatus may also be taken as the same apparatus type when a portion of the information that indicates the type of its own device that is included in the EDID, for example, the format (product code), is the same. In addition, a repeater apparatus is one example of a first image display device and a next-stage side apparatus is one example of a second image display device. Further, a preceding-stage side apparatus is one example of a third apparatus.

Figure 6:
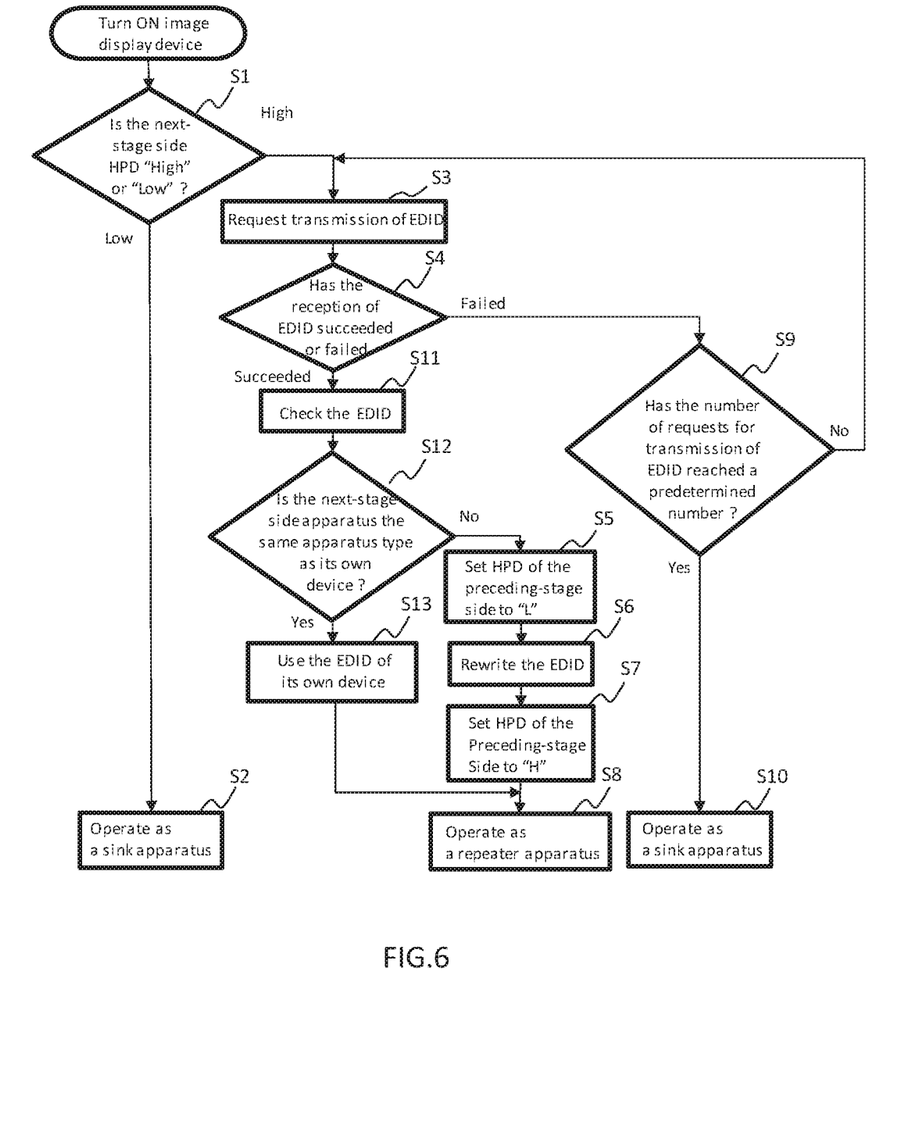
FIG. 6 is a flow chart that shows an example of the processing procedures of the multi-display system of the present invention.

FIG. 6 is a flow chart showing an example of the processing procedures of a multi-display system of the present invention. The configuration of the multi-display system is similar to that of the multi-display system of the background art shown in FIG. 1, and the configuration of an image display device is similar to that of the image display device of the background art shown in FIG. 2, and explanation of these components is therefore here omitted. Each image display device need not be a projector, and, for example, may be a display. In addition, the source apparatus is not limited to PC 5 and may be any type of apparatus that can supply a video signal and audio signal to an image display device, such as a video recorder, a Blu-ray disk player, a game apparatus, a tablet terminal, or a smartphone.

The multi-display system shown in FIG. 1 shows an example of a configuration in which PC 5 (source apparatus) and projectors 1-4 (image display devices) are connected by HDMI, but a configuration may also be adopted in which the source apparatus and each image display device are connected by interfaces that differ from HDMI such as DVI (Digital Visual Interface), DP (DisplayPort), and HDBaseT (registered trademark). In addition, HPD (Hot Plug Detect) signals are used not only in HDMI, but also in DVI, DP, and HDBaseT. In addition, the processing shown in FIG. 6 is assumed to be executed in interface circuit 10 (control unit 12) shown in FIG. 2.

As shown in FIG. 6, when the power supply is introduced (turned ON), an image display device checks the HPD signal of the next-stage side apparatus (Step S1), sets the HPD signal of the preceding-stage side apparatus to "H" when this HPD signal is "L," and operates as a sink apparatus (Step S2). When the HPD signal of the next-stage side apparatus is "H," the image display device issues a signal to the next-stage side apparatus requesting the transmission of EDID (Step S3).

The image display device next determines whether the reception of the EDID of the next-stage side apparatus was successful (Step S4), and if the reception of the EDID was successful, checks the manufacturer and product code of the next-stage side apparatus that is contained in the EDID (Step S11) and determines whether the next-stage side apparatus is of the same apparatus type as its own device (Step S12).

If the next-stage side apparatus is of the same apparatus type as its own device, the image display device uses the EDID of its own device without copying the EDID of the next-stage side apparatus (Step S13) and operates as a repeater apparatus. On the other hand, if the next-stage side apparatus is of a different apparatus type than its own device, the image display device sets the HPD signal of the preceding-stage side apparatus to "L" (Step S5) and carries out the process of rewriting the EDID of its own device to the EDID of the next-stage side apparatus that was received (Step S6). When the rewriting of the EDID is completed and preparation for signal reception is completed, the image display device sets the HPD signal of the preceding-stage side apparatus to "H" (Step S7) and then operates as a repeater apparatus (Step S8). In other words, when the rewriting process is carried out, the image display device sets the HPD signal of the preceding-stage side apparatus to "L" during the interval of rewriting the EDID of at least its own device to the EDID of the next-stage side apparatus to report noncompletion of preparation for signal reception to the preceding-stage side apparatus.

When the reception of the EDID of the next-stage side apparatus fails in Step S4, the image display device determines whether the number of requests to the next-stage side apparatus for transmission of the EDID has reached a predetermined number (for example, three times) (Step S9). If the number of requests for transmission of EDID has not reached the predetermined number, the image display device returns to Step S3 and repeats the processes up to Step S9. On the other hand, if the number of requests for the transmission of EDID has reached the predetermined number, the image display device sets the HPD signal of the preceding-stage side apparatus to "H" and operates as a sink apparatus (Step S10).

Figure 7:
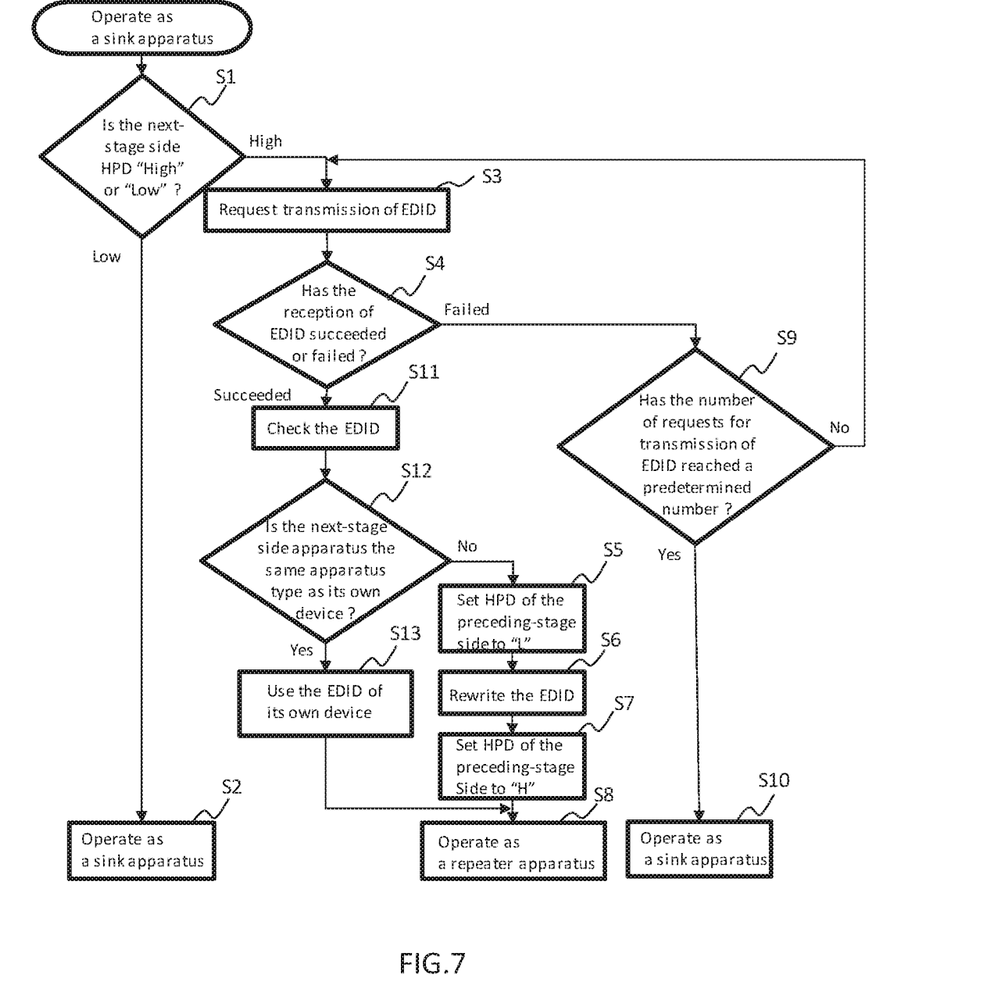
FIG. 7 is a flow chart that shows another example of the processing procedures of the multi-display system of the present invention.

FIG. 7 is a flow chart showing another example of the processing procedures of the multi-display system of the present invention.

FIG. 7 shows an example of processing until it is determined whether its own device is a repeater apparatus or a sink apparatus on the basis of the HPD signal when an image display device that is operating as a sink apparatus detects that the HPD signal of the next-stage side apparatus has changed from "L" to "H". Other processing procedures are the same as shown in the flow chart shown in FIG. 6, and this explanation is therefore here omitted.

When an image display device is operating as a sink apparatus, the image display device detects the HPD signal on the next-stage side at a predetermined timing, for example, at regular intervals.

As shown in FIG. 7, by determining whether its own device is a repeater apparatus or a sink apparatus on the basis of an HPD signal, an image display device is reset to a repeater apparatus or a sink apparatus even when the image display device is operating as a sink apparatus.

According to the present invention, each image display device (repeater apparatus) uses its own EDID without alteration and without rewriting the EDID of its own device when the next-stage side apparatus is the same apparatus type as its own device. As a result, the process of rewriting the EDID of each repeater apparatus in a multi-display system is reduced. In addition, by omitting processes of rewriting EDID in repeater apparatuses, the process of setting the HPD signal of the preceding-stage side apparatus to "L" before rewriting an EDID to report the noncompletion of preparation for signal reception to the preceding-stage side apparatus is also eliminated.

In particular, when a multi-display system is made up from image display devices that are all of the same apparatus type, the process of rewriting EDID in repeater apparatuses becomes unnecessary and the process of reporting the non-completion of preparation for signal reception also becomes unnecessary. As a result, a reduction of the time required before image display when starting operation of a multi-display system can be expected.

In addition, according to the present invention, in a configuration in which a source apparatus and a plurality of image display devices are daisy-chain connected by HDBaseT, the process of rewriting the EDID in the preceding-stage side apparatus is not executed if these apparatuses are of the same type even when a request for the transmission of a video signal is issued from any repeater apparatus to a preceding-stage side apparatus.

Accordingly, the problem of non-display of images at the start of operation of a multi-display system that occurs due to the repeated execution of unnecessary EDID rewriting processes in each image display device is mitigated.

Although the invention of the present application has been described above with reference to exemplary embodiments, the invention of the present application is not limited to the above-described exemplary embodiments. The configuration and details of the invention of the present application are open to various modifications within the scope of the invention of the present application that will be clear to one of ordinary skill in the art.

All or a portion of the above-described exemplary embodiments can be described as noted below but is not limited to the following configurations.

(Supplementary Note 1)

An image display device that is daisy-chain connected has:

a storage unit that holds identification data that includes information of its own device; and a control unit that, when a next-stage side apparatus is connected that is an image display device that can receive a video signal that its own device repeats, receives identification data of that next-stage side apparatus from the next-stage side apparatus and that retains the identification data of its own apparatus without alteration when the identification data that were received indicate that the next-stage side apparatus is the same apparatus type as its own apparatus.
(Supplementary Note 2)
The image display device described in Supplementary Note 1, when the identification data that was received indicates that the next-stage side apparatus is of a different apparatus type than its own device, carries out a process of rewriting the identification data of its own device to the identification data of the next-stage side apparatus.
(Supplementary Note 3)
In the image display device described in Supplementary Note 2, the control unit reports the noncompletion of preparation for signal reception to the preceding-stage side apparatus that supplies the video signal to its own device at least during the time interval of rewriting the identification data of its own device to the identification data of the next-stage side apparatus.
(Supplementary Note 4)
The image display device described in Supplementary Note 3 uses an interface of any of HDMI (High-Definition Multimedia Interface), DVI (Digital Visual Interface), DP (Display Port) and HDBaseT to establish a connection to the preceding-stage side apparatus; and the noncompletion of preparation for the signal reception is a "Low" HPD (Hot Plug Detect) signal that is used in the interface.
(Supplementary Note 5)
In the image display device described in any one of Supplementary Notes 1 to 4, the identification data include at least information that indicates the apparatus type of the image display device.
(Supplementary Note 6)
An image display device that is daisy-chain connected and that uses an interface of any of HDMI (High-Definition Multimedia Interface), DVI (Digital Visual Interface), DP (Display Port) and HDBaseT to connect to a preceding-stage side apparatus that supplies a video signal; has:
a storage unit that holds identification data that include information of its own device; and
a control unit that, when a next-stage side apparatus is connected that is an image display device that can receive a video signal that its own device repeats, receives identification data of the next-stage side apparatus from the next-stage side apparatus and holds an HPD (Hot Plug Detect) signal that is set to "High" and that is used in the interface if the identification data that were received indicate that the next-stage side apparatus is the same apparatus type as its own device.
(Supplementary Note 7)
A connection method of an image display device that is daisy-chain connected has steps of:
when a second image display device that is an image display device that can receive a video signal that a first image display device repeats is connected to that first image display device, the first image display device receiving identification data of the second image display device from the second image display device; and
retaining the identification data of the first image display device without alteration if the identification data that were received indicate that the second image display device is the same apparatus type as the first image display device.
(Supplementary Note 8)
The connection method of an image display device described in Supplementary Note 7 further includes a step of, when the identification data that were received indicate that the apparatus type of the second image display device differs from the apparatus type of the first image display device, performing a process of rewriting the identification data of the first image display device to the identification data of the second image display device.
(Supplementary Note 9)
In the connection method of an image display device described in Supplementary Note 8, when carrying out the rewriting process, the first image display device reports the noncompletion of preparation for signal reception to a third apparatus that supplies the video signal to the first image display device at least during the interval of carrying out the rewriting process.
(Supplementary Note 10)
In the connection method of an image display device described in Supplementary Note 9, the first image display device is connected to the third apparatus using an interface of any of HDMI (High-Definition Multimedia Interface), DVI (Digital Visual Interface), DP (Display Port) and HDBaseT, and the noncompletion of preparation for signal reception is a "Low" HPD (Hot Plug Detect) signal that is used in the interface.
(Supplementary Note 11)
In the connection method of an image display device described in any one of Supplementary Notes 7 to 10, the identification data include at least information that indicates the apparatus type of the image display device.
(Supplementary Note 12)
A connection method of an image display device that is daisy-chain connected and that uses an interface of any of HDMI (High-Definition Multimedia Interface), DVI (Digital Visual Interface), DP (Display Port) and HDBaseT to connect to a preceding-stage side apparatus that supplies a video signal has steps of:
when a next-stage side apparatus is connected that is an image display device that can receive a video signal that its own device repeats, receiving identification data of the next-stage side apparatus from the next-stage side apparatus; and
holding an HDP (Hot Plug Detect) signal that is used in the interface and that is set to "High" if the identification data that were received indicate that the next-stage side apparatus is the same apparatus type as its own device.
(Supplementary Note 13)
A multi-display system has a plurality of image display devices that display images indicated by a video signal, the plurality of image display devices being daisy-chain connected, wherein the image display devices each have:
a storage unit that holds identification data that includes information of its own device; and
a control unit that, when a next-stage side apparatus is connected that is an image display device that can receive the video signal that its own device repeats, receives identification data of that next-stage side apparatus from the next-stage side apparatus and retains the identification data of its own device without alteration if the identification data that were received indicate that the next-stage side apparatus is the same apparatus type as its own device.

The invention claimed is:

1. An image display device that is daisy-chain connected, comprising:
a storage unit that holds identification data that includes information of its own device; and
a control unit that, when a next-stage side apparatus is connected that comprises an image display device that can receive a video signal that its own device repeats, receives identification data of said next-stage side apparatus from said next-stage side apparatus, that determines whether or not said identification data that was received is the same as said identification data of its own device and that holds the identification data of its own device without executing a process of rewriting said identification data of its own device upon determining that said identification data that was received is the same as said identification data of its own device, wherein said control unit when said identification data that was received indicates that said next-stage side apparatus comprises an apparatus type that is different from its own device, carries out a process of rewriting the identification data of its own device to the identification data of said next stage side apparatus.

2. The image display device according to claim 1, wherein said control unit, when carrying out said rewriting process, reports noncompletion of preparation for signal reception to a preceding-stage side apparatus that supplies said video signal to its own device at least during a time interval of rewriting the identification data of its own device to the identification data of said next-stage side apparatus.

3. The image display device according to claim 2, wherein:
said image display device uses an interface of any of HDMI (High-Definition Multimedia Interface), DVI (Digital Visual Interface), DP (Display Port) and HDBaseT to realize connection to said preceding-stage side apparatus; and
said noncompletion of preparation for signal reception comprises a "Low" HPD (Hot Plug Detect) signal that is used in said interface.

4. The image display device according to claim 1, wherein said identification data include at least information that indicates the apparatus type of an image display device.

5. The image display device according to claim 1, wherein the control unit checks a manufacture code and a product code of the next-stage side apparatus and upon determining that the next-stage side apparatus comprises a same apparatus type as its own device, uses the manufacture code and the product code as is.

6. The image display device according to claim 1, wherein the control unit checks extended display identification data (EDID) of the next-stage side apparatus and upon determining that the next-stage side apparatus comprises a same apparatus type as its own device, uses the EDID of its own device.

7. An image display device that is daisy-chain connected and that uses an interface of any from among HDMI (High-Definition Multimedia Interface), DVI (Digital Visual Interface), DP (Display Port) and HDBaseT to connect to a preceding-stage side apparatus that supplies a video signal, comprising:
a storage unit that holds identification data that include information of its own device; and
a control unit that, when a next-stage side apparatus is connected that comprises an image display device that can receive a video signal that its own device repeats, receives identification data of that next-stage side apparatus from said next-stage side apparatus, that determines whether or not said identification data that was received is the same as said identification data of its own device and holds an HPD (Hot Plug Detect) signal that is set to "High" without executing a process of rewriting said identification data of its own device upon determining that said identification data that was received is the same as said identification data of its own device, wherein, said control unit, when said identification data that was received indicates that said next-statue side apparatus comprises an apparatus tape that is different from its own device, carries out a process of rewriting the identification data of its own device to the identification data of said next-stage side apparatus, wherein said control unit, when carrying out said rewriting process reports noncompletion of preparation for signal reception to a preceding-stage side apparatus that supplies said video signal to its own device at least during a time interval of rewriting the identification data of its own device to the identification data of said next-stage side apparatus, wherein said noncompletion of preparation, for signal reception comprises a "Low" HPD (Hot Plug Detect) signal that is used in said interface.

8. A connection method of an image display device that is daisy-chain connected, the method comprising:
when a second image display device that comprises an image display device that can receive a video signal that a first image display device repeats is connected to that first image display device,
said first image display device receiving identification data of said second image display device from that second image display device, that determines whether or not said identification data that was received is the same as said identification data of its own device; and
retaining the identification data of said first image display device without executing a process of rewriting said identification data of its own device upon determining that upon determining if said identification data that was received is the same as said identification data of its own device, and
when said identification data that was received indicates that the apparatus type of said second image display device differs from the apparatus type of said first image display device,
performing a process of rewriting the identification data of the first image display device to the identification data of said second image display device.

9. The connection method of an image display device according to claim 8, wherein: when carrying out said rewriting process, said first image display device reports noncompletion of preparation for signal reception to a third apparatus that supplies said video signal to said first image display device at least during an interval of carrying out said rewriting process.

10. The connection method of an image display device according to claim 9, wherein said first image display device is connected to said third apparatus using an interface of any of HDMI (High-Definition Multimedia Interface), DVI (Digital Visual Interface), DP (Display Port) and HDBaseT, and said noncompletion of preparation for signal reception comprises a "Low" HPD (Hot Plug Detect) signal that is used in said interface.

11. The connection method of an image display device according to claim 8, wherein said identification data include at least information that indicates the apparatus type of an image display device.

12. A connection method of an image display device that is daisy-chain connected and that uses an interface of any from among HDMI (High-Definition Multimedia Interface), DVI (Digital Visual Interface), DP (Display Port) and HDBaseT to connect to a preceding-stage side apparatus that supplies a video signal, the method comprising:

when a next-stage side apparatus is connected that comprises an image display device that can receive a video signal that its own device repeats, receiving identification data of said next-stage side apparatus from that next-stage side apparatus, and determining whether or not said identification data that was received is the same identification data of its own device;

holding an HPD (Hot Plug Detect) signal that is used in said interface and that is set to "High" without executing a process of rewriting said identification data of its own device upon determining when said identification data that was received is the same as said identification data of its own device;

when said identification data that was received indicates that said next-stage side apparatus comprises an apparatus type that is different from its own device, carrying out a process of rewriting the identification data of its own device to the identification data of said next-stage side apparatus;

when carrying out said rewriting process, reporting noncompletion of preparation for signal reception to a preceding-stave side apparatus that supplies said video signal to its own device at least during a time interval of rewriting, the identification data of its own device to the identification data of said next-stage side apparatus, wherein said noncompletion of preparation for signal reception comprises a "Low" HPD (Hot Plug Detect) signal that is used in said interface.

13. A multi-display system having a plurality of image display devices that display images indicated by a video signal, said plurality of image display devices being daisy-chain connected, and said image display devices each comprising:

a storage unit that holds identification data that include information of its own device; and a control unit that, when a next-stage side apparatus is connected that comprises an image display device that can receive said video signal that its own device repeats, receives identification data of said next-stage side apparatus from that next-stage side apparatus, that determines whether or not said identification data that was received is the same identification data of its own device and retains the identification data of its own device without executing a process of rewriting said identification data of its own device upon determining that said identification data that was received is the same as said identification data of its own device, wherein said control unit, when said identification data that was received indicates that said next-stage side apparatus comprises an apparatus type that is different from its own device, carries out a process of rewriting the identification data of its own device to the identification data of said next-stage side apparatus.

* * * * *